(12) United States Patent
Kalm et al.

(10) Patent No.: US 10,196,208 B1
(45) Date of Patent: Feb. 5, 2019

(54) INVENTORY STORAGE MODULE HAVING A CLOSED CONVEYING LOOP IN A HORIZONTAL PLANE

(71) Applicant: Amazon Technologies, Inc., Seattle, WA (US)

(72) Inventors: William Scott Kalm, Seattle, WA (US); Benjamin Douglas Garcia, Seattle, WA (US); Vahideh Kamranzadeh, Seattle, WA (US); Dinesh Mahadevan, Lynnwood, WA (US); Seshachalamgupta Motamarri, Redmond, WA (US); Tyson Wittrock, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/721,280

(22) Filed: Sep. 29, 2017

(51) Int. Cl.
*B65G 1/04* (2006.01)
*B65G 1/06* (2006.01)
(Continued)

(52) U.S. Cl.
CPC ........... *B65G 1/045* (2013.01); *B65G 1/0492* (2013.01); *B65G 1/065* (2013.01); *B65G 47/905* (2013.01); *B65G 1/1373* (2013.01)

(58) Field of Classification Search
CPC .. B65G 47/5145; B65G 47/5113; B65G 1/02; B65G 1/023; B65G 1/0492; B65G 1/137
(Continued)

(56) References Cited

U.S. PATENT DOCUMENTS 1,905,924 A    4/1933  MacLauchlan
3,184,030 A *  5/1965  Ludwig ............... B29C 45/0433
                                              198/468.01
(Continued)

FOREIGN PATENT DOCUMENTS

DE    2013005 A1   9/1971
DE    2552914 A1   6/1976
(Continued)

OTHER PUBLICATIONS

U.S. Appl. No. 15/408,128, filed Jan. 17, 2017, Battles et al.
(Continued)

*Primary Examiner* — James R Bidwell
(74) *Attorney, Agent, or Firm* — Baker & Hostetler LLP (57) ABSTRACT

In one embodiment, an inventory storage module has first to fourth conveyor segments that define a closed conveying loop in a horizontal plane. The storage module can translate inventory carriers around the closed loop until a desired one of the inventory carriers is presented at one end of the module. The first conveyor segment translates inventory carriers along a first longitudinal direction. The second conveyor segment is offset from the first segment along a first lateral direction and translates inventory carriers along a second longitudinal direction, opposite the first longitudinal direction. The third conveyor segment translates inventory carriers from the first conveyor to the second segment along a first lateral direction at a second end of the module. The fourth conveyor segment translates inventory carriers from the second segment to the first segment along a second lateral direction, opposite the first lateral direction, at a first end of the module.

18 Claims, 8 Drawing Sheets

(51) Int. Cl.
*B65G 47/90* (2006.01)
*B65G 1/137* (2006.01)

(58) Field of Classification Search
USPC .......... 198/347.4, 580, 347.1; 414/273, 278, 414/279
See application file for complete search history.

(56) References Cited

U.S. PATENT DOCUMENTS

| | | | | |
|---|---|---|---|---|
| 3,809,208 A * | 5/1974 | Shields | .................. | B65G 35/00 198/465.2 |
| 3,904,022 A * | 9/1975 | Lutz | .......................... | B60P 1/36 198/580 |
| 4,093,086 A | 6/1978 | Lucas et al. | | |
| 4,346,803 A | 8/1982 | Haessler et al. | | |
| 4,372,723 A | 2/1983 | De Coene et al. | | |
| 4,378,873 A | 4/1983 | Cloudy | | |
| 4,465,417 A * | 8/1984 | Baumann | .............. | B61B 12/022 198/347.1 |
| 4,934,507 A * | 6/1990 | Blocker | .................. | B65G 37/02 198/346.1 |
| 5,387,064 A | 2/1995 | Cardinal | | |
| 5,465,827 A | 11/1995 | Nakagawa et al. | | |
| 5,472,309 A | 12/1995 | Bernard, II et al. | | |
| 5,707,199 A | 1/1998 | Faller | | |
| 6,098,786 A * | 8/2000 | Brumm | .................. | B65G 13/02 198/463.3 |
| 6,336,549 B1 | 1/2002 | Jen | | |
| 6,626,282 B1 * | 9/2003 | Nishizawa | ............ | B23P 19/001 198/465.2 |
| 6,752,583 B2 | 6/2004 | Rajewski | | |
| 6,784,391 B2 * | 8/2004 | Takizawa | ................ | B07C 7/005 198/580 |
| 6,814,214 B2 | 11/2004 | Warlow et al. | | |
| 6,814,221 B2 | 11/2004 | Goussev | | |
| 7,090,068 B2 * | 8/2006 | Matsuo | .................... | B23Q 7/02 198/465.1 |
| 7,381,022 B1 | 6/2008 | King | | |
| 7,798,305 B2 * | 9/2010 | Camelli | .................. | B65G 47/80 198/347.1 |
| 8,308,418 B2 * | 11/2012 | Ma | .......................... | B65G 37/02 198/347.4 |
| 8,939,296 B2 | 1/2015 | Weyler et al. | | |
| 8,972,045 B1 | 3/2015 | Mountz et al. | | |
| 9,028,613 B2 | 5/2015 | Kim et al. | | |
| 9,434,558 B2 | 9/2016 | Criswell | | |
| 9,520,012 B2 | 12/2016 | Stiernagle | | |
| 9,550,626 B2 | 1/2017 | Parodi et al. | | |
| 9,796,527 B1 | 10/2017 | Kaukl et al. | | |
| 2008/0093313 A1 | 4/2008 | Huber | | |
| 2010/0316468 A1 * | 12/2010 | Lert | ...................... | B65G 1/045 414/273 |
| 2011/0313811 A1 | 12/2011 | Urban et al. | | |
| 2012/0118699 A1 * | 5/2012 | Buchmann | ......... | B65G 47/5145 198/347.1 |
| 2015/0352721 A1 | 12/2015 | Wicks et al. | | |
| 2015/0360865 A1 | 12/2015 | Massey | | |
| 2016/0075512 A1 * | 3/2016 | Lert, Jr. | ............... | B65G 1/0492 414/273 |
| 2017/0107056 A1 | 4/2017 | Kadaba et al. | | |

FOREIGN PATENT DOCUMENTS

| | | | | |
|---|---|---|---|---|
| DE | 3941754 | * | 6/1991 | ............... B65G 1/04 |
| DE | 102013008872 A1 | | 11/2014 | |
| FR | 2292646 A1 | | 6/1976 | |
| GB | 1516120 A | | 6/1978 | |
| JP | S54-031175 A | | 3/1979 | |
| JP | 61-114907 | * | 6/1986 | ............... B65G 1/04 |
| JP | H01-162611 A | | 6/1989 | |
| JP | H05-294181 A | | 11/1993 | |
| JP | H05-294412 A | | 11/1993 | |
| JP | H05-319517 A | | 12/1993 | |
| WO | WO 2002/074663 A1 | | 9/2002 | |
| WO | WO 2007/036250 A1 | | 4/2007 | |
| WO | WO 2014/092145 A1 | | 6/2014 | |
| WO | WO 2015/147033 A1 | | 10/2015 | |

OTHER PUBLICATIONS

U.S. Appl. No. 15/408,207, filed Jan. 17, 2017, Battles et al.
U.S. Appl. No. 15/408,182, filed Jan. 17, 2017, Battles et al.
U.S. Appl. No. 15/797,562, filed Oct. 30, 2017, Kalm et al.
"Vertical Lift Modules—Shuttle XP Family Flexible Storage Solutions in a Compact Footprint"; http://www.kardexremstar.com/us/materials-handling-storage-solutions/vertical-lift-modules.html; kardexremstar; accessed Mar. 16, 2018; 8 pages.
"Modular Diamond Phoenix Horizontal Carousels"; https://www.modula.us/products/modula-diamond-phoenix-horizontal-carousels.html; Modula HC; accessed Mar. 16, 2018; 6 pages.
"Robots are AutoStore's iconic laborers"; http://www.autostoresystem.com/Products/Robot; AutoStore; accessed Mar. 19, 2018; 5 pages.
"3D-Matrix Solution"; https://www.ssi-schaefer.com/en-us/products/order-picking/automated-order-picking/3d-matrix-solution--53844; SSI Schafer; accessed Mar. 19, 2018; 4 pages.
"Dematic Multishuttle 2";http://www.dematic.com/en-us/supply-chain-solutions/by-technology/storage-systems/dematic-multishuttle-2/; Dematic; accessed Mar. 19, 2018; 6 pages.
"AS/RS Solutions"; https://www.intelligrated.com/soutions/asrs-solutions; Honeywell Integrated; © 2018; accessed Mar. 19. 2018; 2 pages.
"AS/RS Systems for Distribution & Manufacturing"; http://www.cisco-eagle.com/material-handling-systems/asrs-systems; Cisco-Eagle; © 2018; accessed Mar. 19, 2018; 6 pages.
"Power Automation Systems—PowerStor Deep Lane ASRS"; https://www.youtube.com/watch?v=zJOAVOWlro; Power Automation Systems; Sep. 2011; accessed Mar. 19, 2018; 2 pages.
"AutoStore Logistic—Technical presentation"; https://www.youtube.com/watch?v=jyVDMp2bL9c; Aug. 2009; accessed Mar. 19, 2018; 3 pages.
"Scalable multi-level shuttle Navette at Karl Storz: A future-proof investments"; https://www.youtube.com/watch?v=jEyqkQFp1Uw; SSI Schafer; Jun. 2016; accessed Mar. 19, 2018; 2 pages.
"Automated Vertical Carousels"; https://www.youtube.com/watch?v=5STR9jKABxQ; Cisco-Eagle; Dec. 2015; accessed Mar. 19, 2018; 2 pages.
International Patent Application No. PCT/US2018/013922; Int'l Search Report and the Written Opinion; dated Jun. 21, 2018; 16 pages.
International Patent Application No. PCT/US2018/013920; Int'l Search Report and the Written Opinion; dated Jun. 21, 2018; 16 pages.

* cited by examiner

Fig.7

# INVENTORY STORAGE MODULE HAVING A CLOSED CONVEYING LOOP IN A HORIZONTAL PLANE

BACKGROUND

Inventory storage facilities such as warehouses and distribution centers commonly employ shelving units to hold inventory items until they are needed to fulfill a customer order. The shelving units are arranged in rows that are spaced from one another so as to define aisles between the rows of shelving units. To store an inventory item on a desired shelving unit, a human can carry the inventory item down an aisle in the warehouse to the desired shelving unit and place the inventory item on the desired shelving unit where it is stored until it is needed. When an order is placed, a human can travel down the aisle to the desired shelving unit, retrieve the inventory item from the desired shelving unit, and place the inventory item on a conveyor belt that carries the inventory item downstream for packaging and shipping.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings.

DETAILED DESCRIPTION

In inventory storage facilities, storage density is an important characteristic. Packing inventory items closer together reduces the overall volume that is needed to store the inventory items. Thus, a smaller building or structure can be used to store inventory items that are packed closer together. Alternatively, in an existing storage facility, increasing density can free up warehouse space that can be used to store additional inventory items, thereby increasing the capacity of the storage facility. Presented herein are inventory storage modules and storage systems that can have a higher storage density than the conventional shelving units discussed above.

Figure 1:
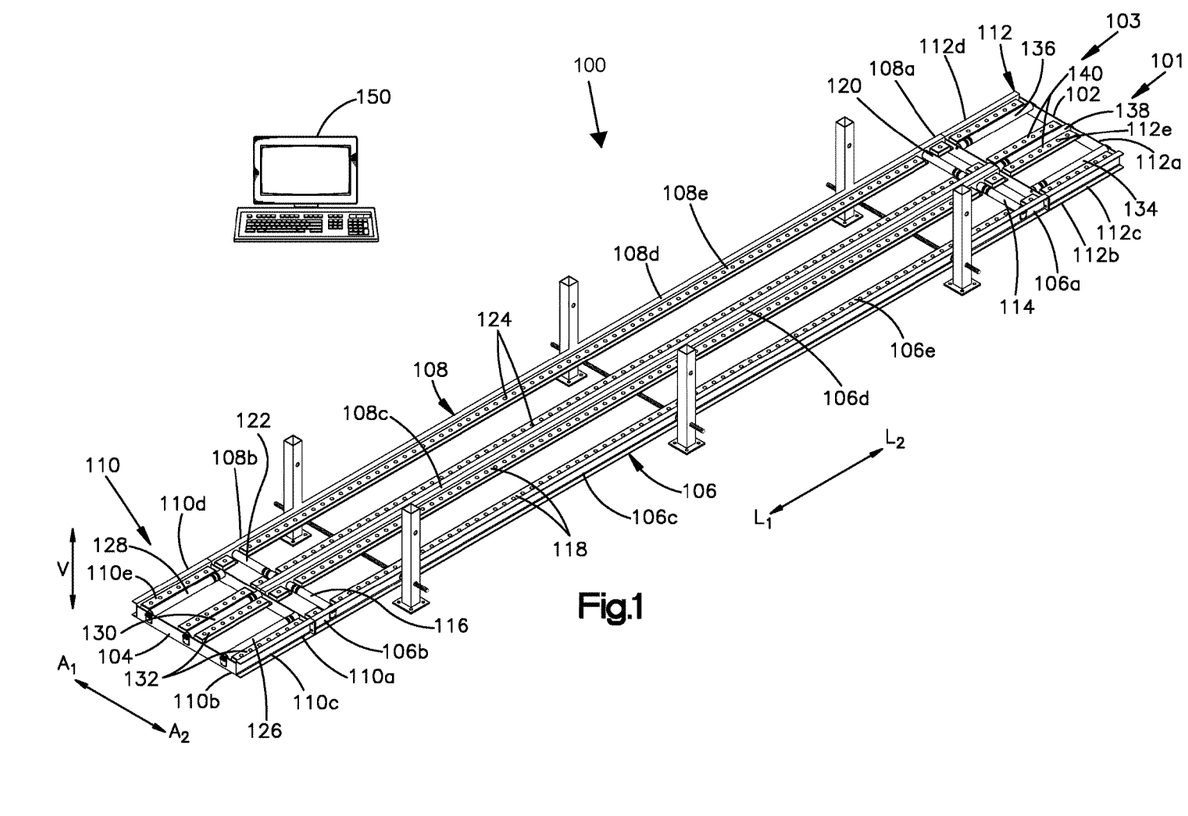
FIG. 1 shows a perspective view of a storage module according to one embodiment.

Referring to FIG. 1, an inventory storage module 100 according to one embodiment is shown that is configured to store inventory items. In general, the storage module 100 has a first module end 102, and a second module end 104 spaced from the first module end 102 along a first longitudinal direction $L_1$ such that the storage module 100 is elongate from the first module end 102 to the second module end 104. The storage module 100 also has a first module side 101, and a second module side 103 spaced from the first module side 101 along a first lateral direction $A_1$, perpendicular to the first longitudinal direction $L_1$. The storage module 100 comprises a plurality of conveyor segments, such as first to fourth conveyor segments 106, 108, 110, and 112, that define a closed conveying loop in a horizontal plane. The conveyor segments are configured to translate a plurality of inventory carriers 300 (see FIGS. 2-8) around the closed loop until a desired one of the inventory carriers 300 is presented at one of the first module end 102 and the second module end 104. At such position, the desired inventory carrier 300 can be accessed by a person or machine such as a robotic arm so that an inventory item can then be placed onto the desired inventory carrier 300 for storage or can be removed from the desired inventory carrier 300 to fulfill a customer order or for further transporting or processing.

In some embodiments, the conveyor segments can operate in a unidirectional manner such the inventory carriers 300 can be moved in only a first direction (that is, clockwise or counterclockwise) around the closed conveying loop. Alternatively, the conveyor segments 106, 108, 110, and 112 can operate in a bidirectional manner such the inventory carriers 300 can be selectively rotated in one of the first direction and a second direction, opposite the first direction. The movement and positioning of inventory carriers 300 can be controlled by a controller 150, which can be in wired or wireless communication with the segments of the storage module. The controller 150 can control the speed and optionally the direction in which the inventory carriers are translated. Further, the controller 150 can stop translation of the inventory carriers when a desired inventory carrier is presented at one of the first and second ends 102 and 104.

Referring now more specifically to the details of the conveyor segments, the first conveyor segment 106 has a first longitudinal end 106a, and a second longitudinal end 106b that is offset from the first longitudinal end 106a along the first longitudinal direction $L_1$. The first conveyor segment 106 is elongate from the first longitudinal end 106a to the second longitudinal end 106b, and therefore, can be considered to be a first longitudinal conveyor segment. The first conveyor segment 106 has a first lateral side 106c and a second lateral side 106d spaced from the first lateral side 106c along the first lateral direction $A_1$, perpendicular to the first longitudinal direction $L_1$. The first conveyor segment 106 further has at least a one conveyor surface 106e (herein referred to as a first conveyor surface) that extends between the first and second longitudinal ends 106a and 106b and between the first and second lateral sides 106c and 106d.

The first conveyor segment 106 is configured to translate inventory carriers 300 along the first conveyor surface 106e from the first longitudinal end 106a to the second longitudinal end 106b along the first longitudinal direction $L_1$ when the conveyor segments operate in a clockwise direction as viewed looking down on the first conveyor surface 106e.

Additionally or alternatively, the first conveyor segment 106 is configured to translate inventory carriers 300 along the conveyor surface 106e from the second end 106b to the first end 106a along a second longitudinal direction $L_2$, opposite the first longitudinal direction $L_1$, when the conveyor segments operate in a counterclockwise direction as viewed looking down on the first conveyor surface 106e.

The second conveyor segment 108 has a first longitudinal end 108a, and a second longitudinal end 108b that is offset from the first longitudinal end 108a along the first longitudinal direction $L_1$. The second conveyor segment 108 is elongate from the first longitudinal end 108a to the second longitudinal end 108b, and therefore, can be considered to be a second longitudinal conveyor segment. The second conveyor segment 108 has a first lateral side 108c and a second lateral side 108d spaced from the first lateral side 108c along the first lateral direction $A_1$. The second conveyor segment 108 further has at least one conveyor surface 108e (herein referred to as a second conveyor surface) that extends between the first and second longitudinal ends 108a and 108b and between the first and second lateral sides 108c and 108d.

The second conveyor segment 108 is configured translate inventory carriers 300 along the second conveyor surface 108e from the second end 108b to the first end 108a along the second longitudinal direction $L_2$ when the conveyor segments operate in a clockwise direction as viewed looking down on the second conveyor surface 108e. Additionally or alternatively, the second conveyor segment 108 is configured to translate inventory carriers 300 along the second conveyor surface 108e from the first end 108a to the second end 108b along a first longitudinal direction $L_1$ when the conveyor segments operate in a counterclockwise direction as viewed looking down on the second conveyor surface 108e.

The second conveyor segment 108 is offset from the first conveyor segment 106 along the first lateral direction $A_1$. In some embodiments, the second conveyor segment 108 is offset from the first conveyor segment 106 by a distance that is no greater than an outer-most width of one of the first and second conveyor segments 106 and 108 along the first lateral direction $A_1$. For example, the first lateral side 108c of the second conveyor segment 108 can be adjoined to the second lateral side 106d of the first conveyor segment 106 as shown such that no gap exists between the first and second conveyor segments 106 and 108. As another example, the first lateral side 108c of the second conveyor segment 108 can be spaced from the second lateral side 106d of the first conveyor segment 106 such that a non-zero gap extends between the first and second conveyor segments 106 and 108, where the non-zero gap has a width along the first lateral direction $A_1$ from the second lateral side 106d of the first conveyor segment 106 to the first lateral side 108c of the second conveyor segment 108 that is no greater than the outer-most width of one of the first and second conveyor segments 106 and 108 along the first lateral direction $A_1$. It will be understood that larger gap sizes are possible. The width of the gap is inversely proportional to the storage density of the module 100. Smaller gap widths result in higher storage densities, while larger gap widths result in lower storage densities.

The third conveyor segment 110 has a first longitudinal side 110a, and a second longitudinal side 110b that is offset from the first longitudinal side 110a along the first longitudinal direction $L_1$. The third conveyor segment 110 has a first lateral end 110c, and a second lateral end 110d that is offset from the first lateral end 110c along the first lateral direction $A_1$. The third conveyor segment 110 further has a conveyor surface 110e (herein referred to as the third conveyor surface) that extends between the first and second longitudinal sides 110a and 110b and between the first and second lateral ends 110c and 110d.

The third conveyor segment 110 is offset from both the first and second conveyor segments 106 and 108 along the first longitudinal direction $L_1$. The first longitudinal side 110a of the third conveyor segment 110 can be adjoined to the second longitudinal end 106b of the first conveyor segment 106 and the second longitudinal end 108b of the second conveyor segment 108. Further, the third conveyor segment 110 extends from the second end 106b of the first conveyor segment 106 to the second end 108b of the second conveyor segment 108. Thus, the third conveyor segment 110 connects the first longitudinal conveyor segment 106 and the second longitudinal conveyor segment 108 to one another, and can therefore be considered to be a first connecting conveyor segment.

The third conveyor surface 110e is configured to translate inventory carriers from the second end 106b of the first conveyor segment 106 to the second end 108b of the second conveyor segment 108 along the first lateral direction $A_1$ when the conveyor segments operate in a clockwise direction as viewed looking down on the third conveyor surface 110e. Additionally or alternatively, the third conveyor surface 110e is configured to translate inventory carriers 300 along a second lateral direction $A_2$, opposite the first lateral direction $A_1$, when the conveyor segments operate in a counterclockwise direction as viewed looking down on the third conveyor surface 110e. It will be understood that the third conveyor segment 110 can extend from the first conveyor segment 106 to the second conveyor segment 108 in a direction other than the first lateral direction $A_1$. For example, the third conveyor segment 110 can extend from the first conveyor segment 106 to the second conveyor segment 108 in a direction that is oblique to the first longitudinal direction $L_1$ or along a curved path.

The fourth conveyor segment 112 has a first longitudinal side 112a, and a second longitudinal side 112b that is offset from the first longitudinal side 112a along the first longitudinal direction $L_1$. The fourth conveyor segment 112 has a first lateral end 112c, and a second lateral end 112d that is offset from the first lateral end 112c along the first lateral direction $A_1$. The fourth conveyor segment 112 further has a conveyor surface 112e (herein referred to as the fourth conveyor surface) that extends between the first and second longitudinal sides 112a and 112b and between the first and second lateral ends 112c and 112d. At least one, up to all, of the first to fourth conveyor segments 106, 108, 110, and 112 can be aligned along a common horizontal plane. In at least some embodiments, at least one, up to all, of the surfaces 106e, 108e, 110e, and 112e of the first to fourth conveyor segments 106, 108, 110, and 112 can be aligned along a common horizontal plane.

The fourth conveyor segment 112 is offset from both the first and second conveyor segments 106 and 108 along the second longitudinal direction $L_2$. The second longitudinal side 112b of the fourth conveyor segment 112 can be adjoined to the first longitudinal end 106a of the first conveyor segment 106 and the first longitudinal end 108a of the second conveyor segment 108. Further, the fourth conveyor segment 112 extends from the first end 108a of the second conveyor segment 108 to the first end 106a of the first conveyor segment 106. Thus, the fourth conveyor segment 112 connects the first longitudinal conveyor segment 106 and the second longitudinal conveyor segment 108 to one another, and can therefore be considered to be a second connecting conveyor segment. The fourth conveyor surface 112e is configured to translate inventory carriers 300 from the first end 108a of the second conveyor segment 108 to the first end 106a of the first conveyor segment 106 along the second lateral direction $A_2$ when the conveyor segments operate in a clockwise direction as viewed looking down on the fourth conveyor surface 112e. Additionally or alternatively, the fourth conveyor surface 112e is configured to translate inventory carriers 300 along the first lateral direction $A_1$ when the conveyor segments operate in a counter-clockwise direction as viewed looking down on the fourth conveyor surface 112e. It will be understood that the fourth conveyor segment 112 can extend from the first conveyor segment 106 to the second conveyor segment 108 in a direction other than the first lateral direction $A_1$. For example, the fourth conveyor segment 112 can extend from the first conveyor segment 106 to the second conveyor segment 108 in a direction that is oblique to the first longitudinal direction $L_1$ or along a curved path.

In general, conveyor segments of the present disclosure can be implemented using any suitable type of conveyor technology or any combination of suitable technologies. For example, each conveyor segment of the present disclosure can include at least one sliding surface (not shown), at least one rotating conveyor element, or any combination thereof, where each sliding surface or rotating conveyor element at least partially defines the conveyor surface of the conveyor segment. The at least one rotating conveyor element can include at least one powered rotating conveyor element that is configured to rotate in a direction that drives the inventory carriers 300 to translate along a respective one of the conveyor surfaces.

For example, the at least one powered rotating conveyor element can include (without limitation) (i) a motor-driven roller that is driven by a motor that is disposed within the roller such as those made by Interroll, (ii) a chain- or belt-driven roller that is driven by a chain or belt that is in turn driven by a motor that is external to the roller, (iii) a conveyor belt or wire-mesh belt, (iv) any other suitable powered rotating conveyor element, or (v) any combination thereof. The at least one powered rotating conveyor element can extend across only a portion of a conveyor segment such as (without limitation) adjacent an end of the conveyor segment, or can extend across an entire length of a conveyor segment. For example, a conveyor belt or wire-mesh belt can extend adjacent an end of the conveyor segment or can extend across an entire length of a conveyor segment. Similarly, one or more rollers can be disposed adjacent one end of the conveyor segment, or a plurality of rollers can be disposed across an entire length of the conveyor segment.

Additionally or alternatively, the at least one rotating conveyor element can include at least one unpowered rotating conveyor element that rotates in response to an item being translated thereon. The at least one unpowered rotating conveyor element can include (i) a ball, (ii) a roller, (iii) a skate wheel, (iv) any other suitable rotating conveyor element that is configured to roll in response to an inventory carrier being translated thereon, or (v) any combination thereof. The at least one powered rotating conveyor element can extend across only a portion of a conveyor segment such as (without limitation) adjacent a middle portion of the conveyor segment, or can extend across an entire length of a conveyor segment.

Referring now more specifically to the embodiment of FIG. 1, the first conveyor segment 106 includes a first powered rotating conveyor element 114 adjacent the first end 106a and a second powered rotating conveyor element 116 adjacent the second end 106b. The first and second powered rotating conveyor elements 114 and 116 each include a powered roller having a central axis that extends along the first lateral direction $A_1$. The first conveyor segment 106 further includes at least one unpowered rotating conveyor element 118 between the first and second powered rotating conveyor elements 114 and 116. The at least one unpowered rotating conveyor element 118 includes a pair of ball transfer conveyor strips spaced from one another along the first lateral direction $A_1$. Each strip has a plurality of balls aligned along the first longitudinal direction $L_1$, and each ball is configured to roll in response to an item being translated thereon. It will be understood that, in alternative embodiments, the conveyor surface 106e of the first conveyor segment 106 can be implemented using any suitable type of conveyor technology or any combination of suitable technologies as described above.

The second conveyor segment 108 is implemented in a manner that is substantially similar to that of the first conveyor segment 106, although the second conveyor segment 108 is configured to translate items in a direction opposite from that of the first conveyor segment 106. The second conveyor segment 108 includes a first powered rotating conveyor element 120 adjacent the first end 108a and a second powered rotating conveyor element 122 adjacent the second end 108b. The first and second powered rotating conveyor elements 120 and 122 each include a powered roller having a central axis that extends along the first lateral direction $A_1$. The second conveyor segment 108 further includes at least one unpowered rotating conveyor element 124 between the first and second powered rotating conveyor elements 120 and 122. The at least one unpowered rotating conveyor element 124 includes a pair of ball transfer conveyor strips spaced from one another along the first lateral direction $A_1$. Each strip has a plurality of balls aligned along the first longitudinal direction $L_1$, each ball configured to roll in response to an inventory carrier being translated thereon. It will be understood that, in alternative embodiments, the conveyor surface 108e of the second conveyor segment 108 can be implemented using any suitable type of conveyor technology or any combination of suitable technologies as described above.

The third conveyor segment 110 includes a first powered rotating conveyor element 126 adjacent the first end 110c, a second powered rotating conveyor element 128 adjacent the second end 110d, and a third powered rotating conveyor element 130 between the first and second powered rotating conveyor elements 126 and 128. The first to third powered rotating conveyor elements 126 to 130 each include a powered roller having a central axis that extends along the first longitudinal direction $L_1$. The third conveyor segment 110 further includes at least one unpowered rotating conveyor element 132. The at least one unpowered rotating conveyor element 132 includes a ball transfer strip between the first and third powered rotating conveyor elements 126 and 130, and a ball transfer strip between the second and third powered rotating conveyor elements 128 and 130. The at least one unpowered rotating conveyor element 132 can further include a ball transfer strip between the first powered rotating conveyor element 126 and the first end 110c, and a ball transfer strip between the second powered rotating conveyor element 128 and the second end 110d. Each ball transfer strip has a plurality of balls aligned along the first longitudinal direction $L_1$, each ball configured to roll in response to an inventory carrier being translated thereon. It will be understood that, in alternative embodiments, the conveyor surface 110e of the third conveyor segment 110 can be implemented using any suitable type of conveyor technology or any combination of suitable technologies as described above.

The fourth conveyor segment 112 is implemented in a manner that is substantially similar to that of the third conveyor segment 110, although the fourth conveyor segment 112 is configured to translate items in a direction opposite from that of the third conveyor segment 110. The fourth conveyor segment 112 includes a first powered rotating conveyor element 134 adjacent the first end 112c, a second powered rotating conveyor element 136 adjacent the second end 112d, and a third powered rotating conveyor element 138 between the first and second powered rotating conveyor elements 134 and 136. The first to third powered rotating conveyor elements 134 to 138 each include a powered roller having a central axis that extends along the first longitudinal direction $L_1$. The fourth conveyor segment 112 can further include at least one unpowered rotating conveyor element 140. The at least one unpowered rotating conveyor element 140 includes a ball transfer strip between the first and third powered rotating conveyor elements 134 and 138, and a ball transfer strip between the second and third powered rotating conveyor elements 136 and 138. The at least one unpowered rotating conveyor element 140 can further include a ball transfer strip between the first powered rotating conveyor element 134 and the first end 112c, and a ball transfer strip between the second powered rotating conveyor element 136 and the second end 112d. Each ball transfer strip has a plurality of balls aligned along the first longitudinal direction $L_1$, each ball configured to roll in response to an inventory carrier being translated thereon. It will be understood that, in alternative embodiments, the conveyor surface 112e of the fourth conveyor segment 112 can be implemented using any suitable type of conveyor technology or any combination of suitable technologies as described above.

Turning now to FIGS. 3 to 6, a system is shown comprising a storage module 100 and a plurality of inventory carriers 300 arranged in a various rotational positions. Note that the inventory carriers 300 towards the middle of the module 100 are shown as blocks for ease of illustration, but would otherwise be implemented in a manner similar to that discussed below. Each inventory carrier 300 can be any suitable storage container configured to be supported by the storage module 100 and to hold items. For example, each inventory carrier 300 can be a rectangular structure, such as a bin, formed from a rigid material such as high-density plastic, wood, aluminum, or other suitable material. Each inventory carrier 300 can have a first sidewall 302, and a second sidewall 304 that is spaced from first sidewall 302 along the first lateral direction $A_1$. Each storage container can have a first end wall 306, and a second end wall 308 that is spaced from the first end wall 306 along the first longitudinal direction $L_1$. Each inventory carrier 300 can further have an upper end 310 and a bottom surface 312 spaced from one another along a vertical direction V. The bottom surface 312 can extend between the opposed sidewalls 302 and 304 and between the opposed end walls 306 and 308. The upper end 310 can be open for ease of access in placing inventory items into, and retrieving inventory items from, the storage container 300. Each inventory carrier 300 can have an overall width $W_S$ along the first lateral direction $A_1$, an overall height $H_S$ along the vertical direction V, and an overall length Ls along the first longitudinal direction $L_1$. In some embodiments, the overall length Ls can be greater than at least one of the overall width $W_S$ and the overall height $H_S$. In other embodiments, the inventory carriers 300 can be alternatively sized. For example, in some other embodiments, the overall width $W_S$ can be greater than at least one of the overall length Ls and the overall height $H_S$.

The inventory carriers 300 are densely packed along the first and second conveyor segments 106 and 108. For example, the inventory carriers 300 carried by the first conveyor segment 106 are arranged end-to-end such that there is little to no space between adjacent ones of the inventory carriers 300. Similarly, the inventory carriers 300 carried by the second conveyor segment 108 are arranged end-to-end such that there is little to no space between adjacent ones of the inventory carriers 300. In some embodiments, inventory carriers 300 along each conveyor segment may contact one another other. In other embodiments, inventory carriers 300 may be spaced from each other by a distance that is no more than 10 percent of the length of each inventory carrier 300 along the conveyor segment or no more than 5 percent of the length of each inventory carrier 300 along the conveyor segment. In some embodiments, the storage module 100 can be configured such that each of at least one of the inventory carriers 300 may have one or more inventory carrier 300 stacked on top of the inventory carrier 300. Stacking the inventory carriers 300 on top of one another can increase the storage density of the storage module 100 over that of storage modules in which the inventory carriers are not stacked.

One method of translating the inventory carriers 300 around a horizontal conveying loop of the storage module 100 in a clockwise direction according to one embodiment will now be described in connection with FIGS. 3 to 6. In this method, a single inventory carrier 300 is transitioned between the first and second sides 101 and 103 of the module 100 at a time. As the inventory carriers 300 are translated around the horizontal conveying loop, the orientation of each carrier 300 remains fixed. Thus, the second end wall 308 of each carrier 300 remains spaced from the first end wall 306 of the carrier 300 along the first longitudinal direction $L_1$ as the carrier 300 is translated along each of the first to fourth conveyor segments 106 to 112. It will be understood that the carriers 300 can additionally or alternatively be translated in a counterclockwise direction. Further, it will be understood that, in alternative embodiments (such as those in which the third and fourth conveyor segments 110 and 112 extend along a curved path), the orientation of each inventory carrier 300 can rotate as the carrier 300 is translated around the horizontal conveying loop. For example, the orientation of each inventory carrier 300 can rotate such that the second sidewall 304 remains inwardly spaced from the first sidewall 306 as the carrier 300 is translated along each of the first to fourth conveyor segments 106 to 112.

Figure 3:
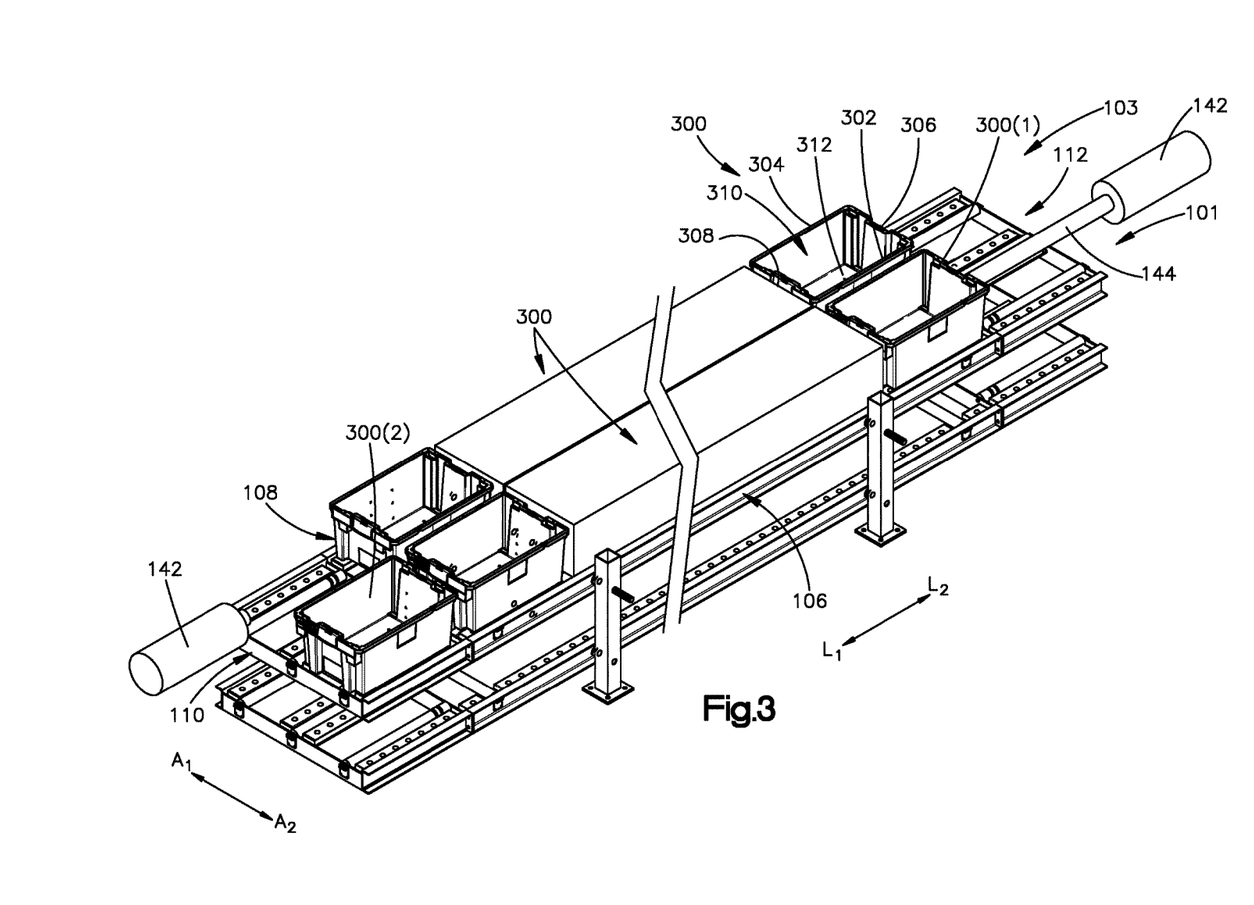
FIG. 3 shows a perspective view of two storage modules of FIG. 1 stacked on top of one another and having inventory carriers arranged in a first rotational position according to one embodiment.

In FIG. 3, a step is shown that comprises causing the inventory carriers 300 to be translated along the first module side 101 along a first longitudinal direction $L_1$. This step can include causing a first inventory carrier 300(1) to be translated from the fourth conveyor segment 112 onto the first conveyor segment 106 along the first longitudinal direction $L_1$. The storage module 100 can include an actuator 142 that is configured to push the first inventory carrier 300(1) at least partially onto the first conveyor segment 106. The actuator 142 can be a linear actuator or any other suitable actuator. In one example, the actuator 142 can be a linear actuator having a shaft 144 that extends in the first longitudinal direction $L_1$ so as to engage and drive the first inventory carrier 300(1) in the first longitudinal direction $L_1$. Additionally or alternatively, the storage module 100 can include a powered rotating conveyor element (not shown) that drives the first inventory carrier 300(1) in the first longitudinal direction $L_1$ at least partially onto the first conveyor segment 106. The unpowered rotating conveyor elements 140 of the fourth conveyor segment 112 are configured to spin in response to the first inventory carrier 300(1) being translated thereon so as to limit the amount of force that is needed to push the first inventory carrier 300(1).

As the first inventory carrier 300(1) comes into contact with the powered rotating conveyor element 114 of the first conveyor segment 106, the powered rotating conveyor element 114 can optionally drive the carrier 300(1) in the first longitudinal direction $L_1$ and/or the first inventory carrier 300(1) can be continued to be pushed by the linear actuator 142. The first inventory carrier 300(1) in turn pushes the inventory carriers in front of it in the first longitudinal direction $L_1$ over the unpowered rotating elements 118 of the first conveyor segment 106. At the second end 106b of the first conveyor segment 106, the powered rotating conveyor element 116 drives a second inventory carrier 300(2) onto the third conveyor segment 110 along the first longitudinal direction $L_1$. The unpowered rotating conveyor elements 118 and 132 of the first and third conveyor segments 106 and 112 are configured to reactively spin in response to the inventory carriers being translated thereon so as to limit the amount of force that is needed to push the inventory carriers. It will be understood that, in alternative embodiments, the first conveyor segment 106 can include one or more powered rotating conveyor element or elements that extend along the length of the first conveyor segment 106. The one or more powered rotating conveyor element or elements can then drive each of the inventory carriers without needing the inventory carriers to push one another and/or without needing an actuator to push the carriers. Further, in alternative embodiments, the first conveyor segment 106 can be devoid of powered rotating conveyor elements, and the inventory carriers can be driven along the first longitudinal direction $L_1$ by an actuator or other mechanism.

Figure 4:
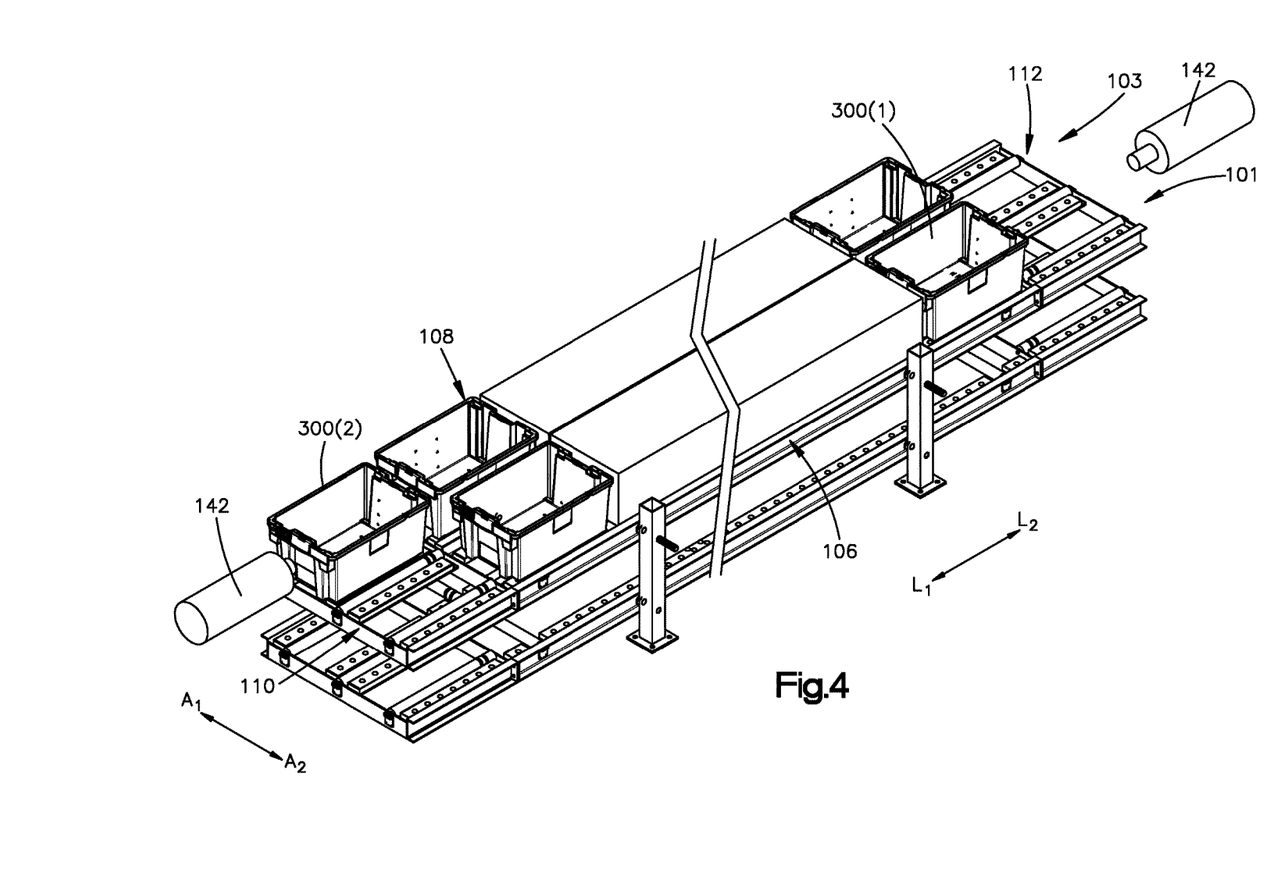
FIG. 4 shows a perspective view of the two storage modules of FIG. 3 with the inventory carriers in a second rotational position.

In FIG. 4, a step is shown that comprises causing the inventory carriers 300 to be translated from the first module side 101 to the second module side 103. This step can comprise causing the second inventory carrier 300(2) to be driven by the third conveyor segment 110 along the first lateral direction $A_1$ so as to be in-line with the second conveyor segment 108 along the first longitudinal direction $L_1$. The second inventory carrier 300(2) can be driven by at least one powered rotating element such as powered rotating elements 126, 128, and 130. In alternative embodiments, the third conveyor segment 110 can be devoid of powered rotating conveyor elements, and the inventory carriers can be driven along the first lateral direction $A_1$ by an actuator or other mechanism.

Figure 5:
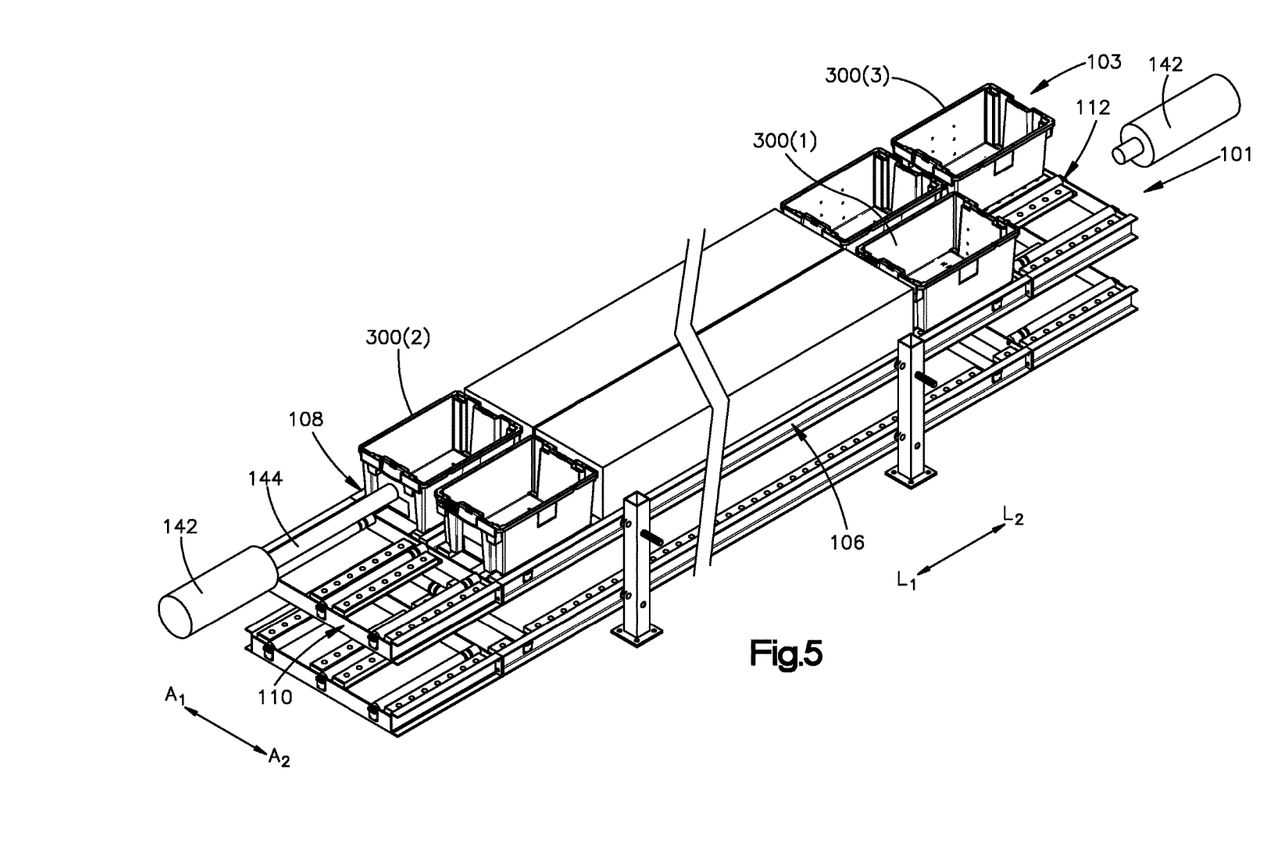
FIG. 5 shows a perspective view of the two storage modules of FIG. 3 with the inventory carriers in a third rotational position.

In FIG. 5, a step is shown that comprises causing the inventory carriers to be translated along the second module side 103 along the second longitudinal direction $L_2$. This step can comprise causing the second inventory carrier 300(2) to be translated from the third conveyor segment 110 onto the second conveyor segment 108 along the second longitudinal direction $L_2$. The storage module 100 can include an actuator 142 that is configured to push the second inventory carrier 300(2) at least partially onto the second conveyor segment 108. The actuator 142 can be a linear actuator or any other suitable actuator. In one example, the actuator 142 can be a linear actuator having a shaft 144 that extends in the second longitudinal direction $L_2$ so as to engage and drive the second inventory carrier 300(2) in the second longitudinal direction $L_2$. Additionally or alternatively, the storage module 100 can include a powered rotating conveyor element (not shown) that drives the second inventory carrier 300(2) in the second longitudinal direction $L_2$ at least partially onto the second conveyor segment 108. The unpowered rotating conveyor elements 132 of the third conveyor segment 110 are configured to spin in response to the second inventory carrier 300(2) being translated thereon so as to limit the amount of force that is needed to push the second inventory carrier 300(2).

As the second inventory carrier 300(2) comes into contact with the powered rotating conveyor element 122 of the second conveyor segment 108, the powered rotating conveyor element 122 can optionally drive the carrier 300(2) in the second longitudinal direction $L_2$ and/or the inventory carrier 300(2) can be continued to be pushed by the linear actuator 142. The second inventory carrier 300(2) in turn pushes the inventory carriers in front of it in the second longitudinal direction $L_2$ over the unpowered rotating elements 124 of the second conveyor segment 108. At the first end 108a of the second conveyor segment 108, the powered rotating conveyor element 120 drives third inventory carrier 300(3) onto the fourth conveyor segment 112 along the second longitudinal direction $L_2$. The unpowered rotating conveyor elements 124 and 140 of the second and fourth conveyor segments 108 and 112 are configured to spin in response to the inventory carriers being translated thereon so as to limit the amount of force that is needed to push the inventory carriers. It will be understood that, in alternative embodiments, the second conveyor segment 108 can include one or more powered rotating conveyor element or elements that extend along the length of the second conveyor segment 108. The one or more powered rotating conveyor element or elements can then drive each of the inventory carriers without needing the inventory carriers to push one another and/or without needing an actuator to push the carriers. Further, in alternative embodiments, the second conveyor segment 108 can be devoid of powered rotating conveyor elements, and the inventory carriers can be driven along the second longitudinal direction $L_2$ by an actuator or other mechanism.

Figure 6:
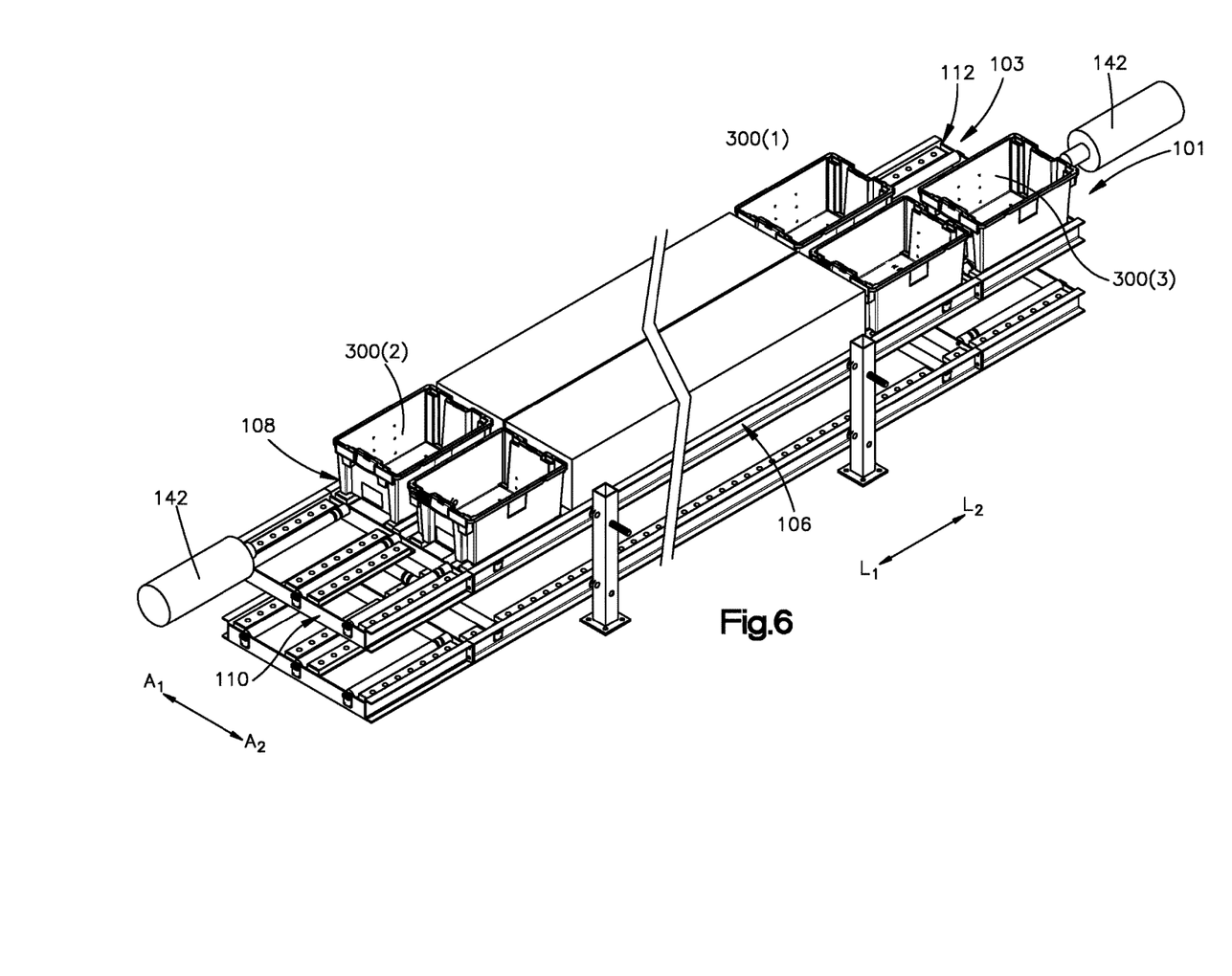
FIG. 6 shows a perspective view of the two storage modules of FIG. 3 with the inventory carriers in a fourth rotational position.

In FIG. 6, a step is shown that comprises causing the inventory carriers to be translated from the second module side 103 to the first module side 101 along the second lateral direction $A_1$. This step can comprise causing the third inventory carrier 300(3) to be driven by the fourth conveyor segment 112 along the second lateral direction $A_2$ so as to be in-line with the first conveyor segment 106 along the first longitudinal direction $L_1$. The third inventory carrier 300(3) can be driven by at least one powered rotating element such as powered rotating elements 134, 136, and 138. In alternative embodiments, the fourth conveyor segment 112 can be devoid of powered rotating conveyor elements, and the inventory carriers can be driven along the second lateral direction $A_2$ by an actuator or other mechanism. It will be understood that method of FIGS. 3 to 6 can begin at any one of the steps of FIGS. 3 to 6, depending on the positions of the storage carriers 300. Further, at least one, up to all, of the steps in FIGS. 3 to 6 can be repeated as desired to present a desired one of the storage containers 300 at one of the first and second ends 102 and 104.

Figure 7:
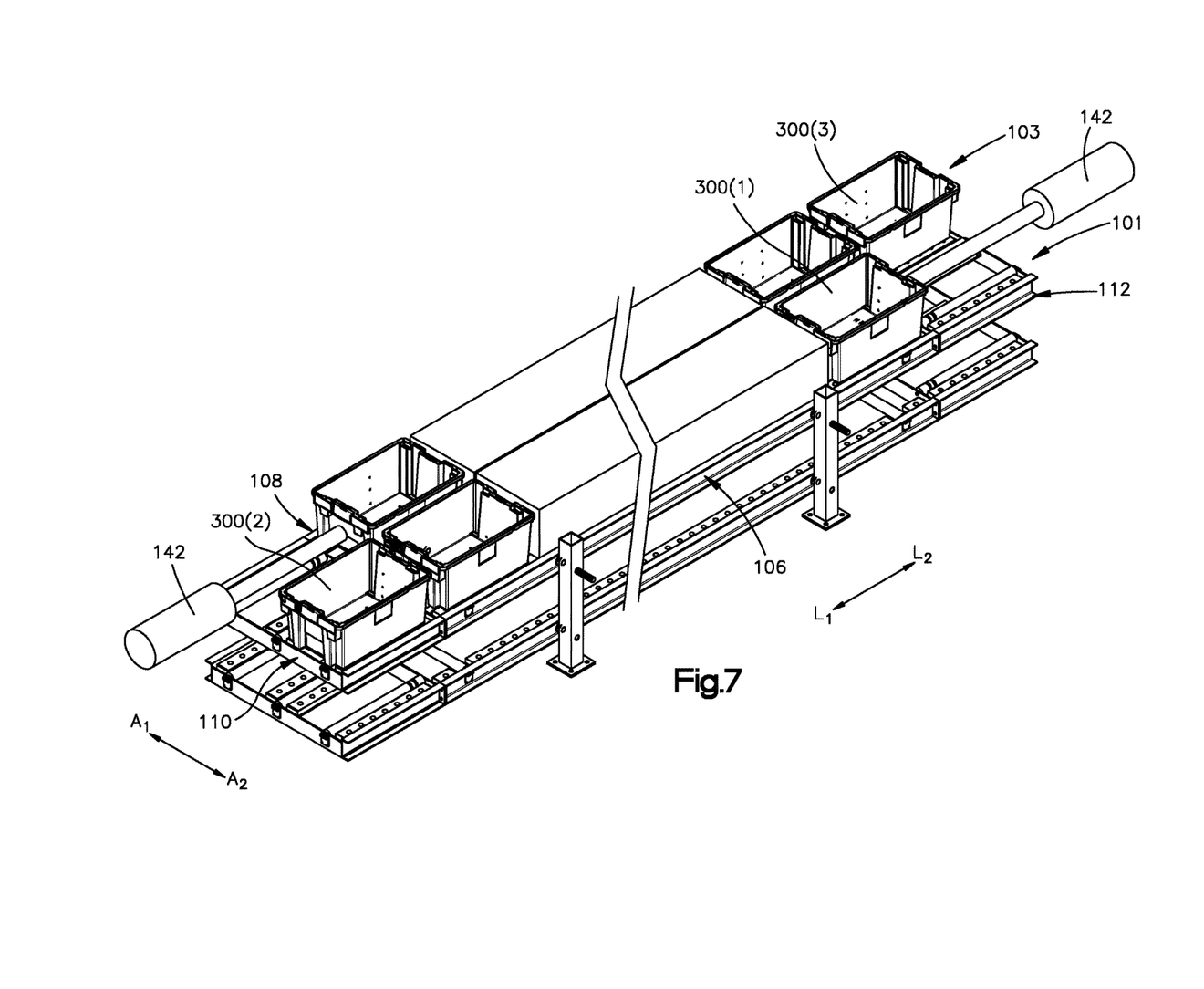
FIG. 7 shows a perspective view of two storage modules of FIG. 1 stacked on top of one another and having inventory carriers in a first rotational position according to another embodiment.
Figure 8:
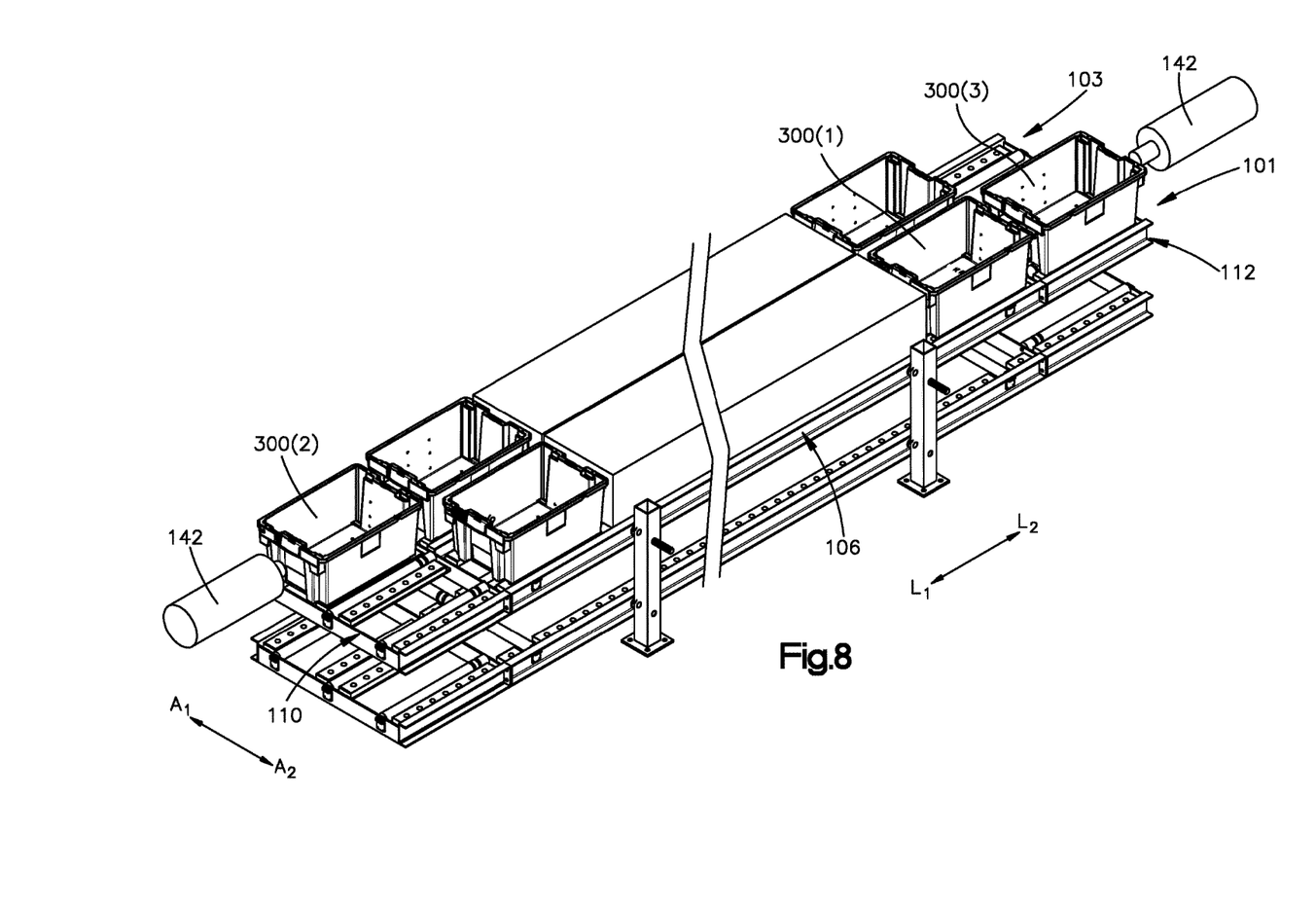
FIG. 8 shows a perspective view of the two storage modules of FIG. 7 with the inventory carriers in a second rotational position.

Turning now to FIGS. 7 to 8, a method of translating the inventory carriers 300 around a conveying loop of the storage module 100 in a clockwise direction according to another embodiment will now be described. In this method, two inventory carriers 300 are transitioned between the first and second sides 101 and 103 at a time. It will be understood that the carriers 300 can additionally or alternatively be translated in a counterclockwise direction. In FIG. 7, a step is shown that combines the steps of FIGS. 3 and 5 above. In particular, this step comprises causing the inventory carriers 300 to be translated along the first module side 101 along a first longitudinal direction $L_1$ as described above, and causing the inventory carriers 300 to be translated along the second module side 103 along the second longitudinal direction $L_2$ as described above. In FIG. 8, a step is shown that combines the steps of FIGS. 4 and 6 above. In particular, this step comprises causing an inventory carrier 300(2) to be translated from the first module side 101 to the second module side 103 as described above, and causing an inventory carrier 300(3) to be translated from the second module side 103 to the first module side 101 as described above.

Figure 2:
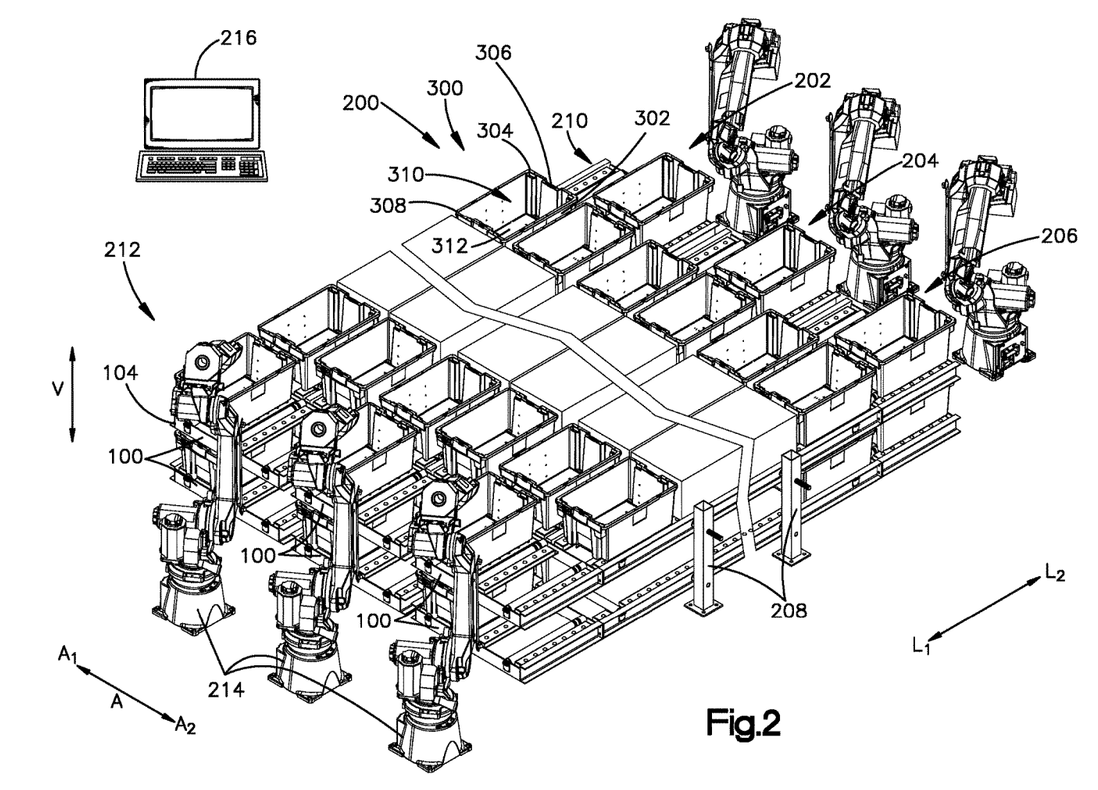
FIG. 2 shows a perspective view of a modular storage and retrieval system according to one embodiment that comprises a plurality of instances of the storage module of FIG. 1 and a plurality of inventory carriers.

Referring now to FIG. 2, a modular storage and retrieval system 200 is shown that comprises a plurality of instances of the storage module 100 of FIG. 1, each supporting a plurality of inventory carriers 300. In general, storage systems of the disclosure can include at least one vertical stack of storage modules that comprises at least two of the storage modules stacked on top of one another along the vertical direction V. In at least some embodiments, the system 200 can include the inventory carriers 300 supported by the system 200, although it will be understood that the system 200 can be made and sold without the inventory carriers 300.

In FIG. 2, the storage system 200 comprises a first system end 210, and a second system end 212 that is spaced from the first system end 210 along the first longitudinal direction $L_1$. The storage system 200 includes a plurality of instances of the storage module 100, each extending from the first system end 210 to the second system end 212. The plurality of storage modules 100 includes a first vertical stack 202 of the storage modules 100 that comprises a plurality (e.g., at least two) of the storage modules 100 stacked on top of one another along the vertical direction V. The storage system 200 further includes a second vertical stack 204 of the storage modules 100 that comprises a plurality (e.g., at least two) of the storage modules 100 stacked on top of one another along the vertical direction V. The second vertical stack 204 can be offset from the first vertical stack 202 along the lateral direction A. The storage system 200 can yet further include a third vertical stack 206 of the storage modules 100 that comprises a plurality (e.g., at least two) of the storage modules 100 stacked on top of one another along the vertical direction V. The third vertical stack 206 can be offset from the second vertical stack 204 along the lateral direction A such that the second vertical stack 204 is between the first and third vertical stacks 202 and 206.

Each storage module 100 of the system 200 can be independently operated such that the inventory carriers 300 of each storage module 100 can be driven around their corresponding conveying loop independently of the inventory carriers 300 of other storage modules 100 being driven around their corresponding conveying loop. Although three vertical stacks 202, 204, and 206, each having two storage modules 100 are shown, it will be understood that the number of vertical stacks and storage modules 100 in each vertical stack can vary from that shown. In particular, modular storage and retrieval systems of the disclosure can include at least one vertical stack of storage modules 100 or more than one vertical stack of storage modules 100. Further, each vertical stack of storage modules 100 can have at least two storage modules 100 stacked on top of one another or more than two storage modules 100. Thus, height, width, and length of the system 200 can be scalable to fit within a desired volume in a warehouse space.

The modular storage and retrieval storage system 200 can include supports 208 that are coupled to the storage modules 100 in each vertical stack 202, 204, and 206 so as to maintain the storage modules 100 in a stacked relation. The supports 208 can further be coupled to the storage modules 100 so as to attach the vertical stacks 202, 204, and 206 of storage modules 100 to one another. The supports 208 can combine to form a frame of the system 200.

The inventory carriers 300 can be stacked on top of one another so that the space between each inventory carrier 300 and a storage module 100 immediately over top of the inventory carrier 300 can be minimized to maximize storage density. In some examples, this spacing can be described by absolute distance, such as a distance ranging from 0.25 to 1.25 inches, such as 0.50 to 1.00 inches. In other examples, this spacing can be described in relation to a height of one of the inventory carriers, such as a spacing that is no more than 20 percent of the height of the inventory carrier, such as no more than 15 percent of the height of the inventory carrier, such as no more than 10 percent of the height of the inventory carrier, or such as no more than 5 percent of the height of the inventory carrier. Storage density is inversely proportional to the distance between an inventory carrier and the storage module immediate over top of the inventory carrier 300. Thus, as this distance is decreased, the storage density increases. However, if this distance is too small, then an inventory carrier 300 might not freely rotate along their respective conveying loops, and might collide with the storage module 100 immediately over top of the inventory carrier 300.

The modular storage and retrieval system 200 can also include at least one robotic manipulator 214. For example, the system 200 can include at least one robotic manipulator 214 that services the first module end 102 of each vertical stack of storage modules 100. The system 200 can additionally or alternatively include at least one robotic manipulator 214 that services the second module end 104 of each vertical stack of storage modules 100 as shown. In some embodiments, the manipulators 214 at the first module ends 102 can be used to stow inventory items or inventory carriers 300 in the storage modules 100, and the manipulators 214 at the second module end 104 can be used to retrieve inventory items or inventory carriers 300 from the storage modules 100. Alternative embodiments can include at least manipulator 214 on only one end of a vertical stack, the at least one manipulator 214 configured to perform both stowing and retrieving operations. Additionally or alternatively, one or more of the robotic manipulators 214 can service multiple vertical stacks of storage modules 100. Although not shown, in some embodiments, the at least one robotic manipulator 214 can be configured to move vertically and/or horizontally to service the storage modules 100 of the system 200. For example, a robotic manipulator 214 can be mounted on a horizontal and/or vertical track to enable it to move with respect to the vertical stacks.

Each robotic manipulator 214 can be any suitable material handling robot (e.g., Cartesian robot, cylindrical robot, spherical robot, articulated robot, parallel robot, SCARA robot, anthropomorphic robot, any other suitable robotic manipulator and/or robotic arm, automated guided vehicles including lift capabilities, vertical lift modules, and any other suitable material handling equipment that interacts with or otherwise handles objects). Each robotic manipulator 214 can include any suitable type and number of sensors disposed throughout the robotic manipulator 214 (e.g., sensors in the base, in the arm, in joints in the arm, in an end effector, or in any other suitable location). The sensors can include sensors configured to detect pressure, force, weight, light, objects, slippage, and any other information that may be used to control and/or monitor the operation of the robotic manipulator 214, including an end effector. The sensors can be in communication with a controller 216. Note that controller 216 can implement (or be the same as) controller 150, or can be separate from controller 150. The controller 216 can be local to the robotic manipulator 214 (e.g., a robotic manipulator controller) or can be separate from, but in communication with, the robotic manipulator 214. In this manner, the controller 216 can control the operation of the robotic manipulator 214 and the end effector based at least in part on sensing information received from the sensors. The sensors may include any suitable combination of sensors capable of detecting depth of objects, capturing RGB and other images of objects, scanning machine-readable information, capturing thermal images, detecting position and orientation of objects, and performing any other suitable sensing as described herein.

Other material conveyance devices (not shown) may also be disposed adjacent to the robotic manipulators 214. The other material conveyance devices can be any suitable material conveyance system including, for example, a horizontal conveyor belt system, a pneumatic conveyor system, a vibrating conveyor system, a flexible conveyor system, a vertical conveyor system, a spiral conveyor system, an overhead conveyor system, and/or any other suitable material conveyance system suitable for conveying items. The other material conveyance devices can be used to transport inventory items and/or storage containers to and from the robotic manipulators 214.

In operation, a method of operating the system 200 comprises causing a desired inventory carrier 300 in the system 200 to be identified to either retrieve an inventory item from or stow an inventory item into. Further, the method comprises causing a location of the inventory carrier 300 in the system 200 to be identified. Identifying the location can include identifying the storage module 100 that supports the identified inventory carrier 300 and optionally the position of the inventory carrier 300 on the identified storage module 100. Once the location is identified, the method comprises causing the inventory carriers 300 of the identified storage module 100 to be translated around the conveying loop of the identified storage module 100 until the desired inventory carrier 300 is presented at a desired one of the first and second ends 102 and 104 of the identified storage module 100. The method then comprises retrieving an inventory item from, or stowing an inventory item into, the desired inventory carrier 300. This step can be performed by a human who manually retrieves an inventory item from the desired inventory carrier 300 or stows the inventory item into the desired inventory carrier 300. Alternatively, this step can comprise causing a robotic manipulator 214 to move so as to retrieve an inventory item from the desired inventory carrier 300, or stow an inventory item into the desired inventory carrier 300. In some embodiments, the human or robotic manipulator 214 can retrieve the desired inventory carrier 300 itself from the system 200, and then the inventory item can be retrieved from the desired inventory carrier 300. The inventory carrier 300 can then be stowed by the human or a robotic manipulator 214 onto a desired one of the storage modules 100. In so doing, the inventory carrier 300 can be stowed onto the same storage module 100 from which the inventory carrier 300 was retrieved for can be stowed in a different storage module. At least one, up to all, of these steps can be controlled by the controller 216.

It should be noted that the illustrations and descriptions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated.

Unless explicitly stated otherwise, each numerical value and range should be interpreted as being approximate as if the word "about" or "approximately" preceded the value or range.

It should be understood that the steps of exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed:

1. A storage module configured to store inventory items, the storage module comprising:

a first module end, and a second module end spaced from the first module end along a first longitudinal direction;

a plurality of conveyor segments that define a closed conveying loop in a horizontal plane, the plurality of conveyor segments configured to translate inventory carriers around the closed loop, without transferring inventory carriers into or outside of the closed conveying loop, until a desired one of the inventory carriers is presented at one of the first module end and the second module end, the plurality of conveyor segments including:

a first conveyor segment having first and second ends and configured to translate inventory carriers from the first end to the second end along a first longitudinal direction;

a second conveyor segment offset from the first conveyor segment along a first lateral direction, perpendicular to the first longitudinal direction, by a distance that is no greater than an outer-most width of one of the first and second conveyor segments along the first lateral direction, the second conveyor segment having first and second ends and being configured to translate inventory carriers from the second end of the second conveyor segment to the first end of the second conveyor segment along a second longitudinal direction, opposite the first longitudinal direction;

a third conveyor segment that has first and second ends, that extends from the second end of the first conveyor segment to the second end of the second conveyor segment, and that is configured to translate inventory carriers from the second end of the first conveyor segment to the second end of the second conveyor segment; and a fourth conveyor segment that has first and second ends, that extends from the first end of the second conveyor segment to the first end of the first conveyor segment, and that is configured to translate inventory carriers from the first end of the second conveyor segment to the first end of the first conveyor segment along a second lateral direction, opposite the first lateral direction, wherein at least one of the first to fourth conveyor segments comprises first and second powered rotating conveyor elements adjacent the first and second ends of the at least one of the first to fourth conveyor segments, respectively, and at least one unpowered rotating conveyor element between the first and second powered rotating conveyor elements, the first and second powered rotating conveyor elements configured to drive the inventory carriers along a conveyor surface of the at least one of the first to fourth conveyor segments.

2. The storage module of claim 1, wherein the third conveyor segment is configured to translate inventory carriers along the first lateral direction that is perpendicular to the first longitudinal direction, and the fourth conveyor segment is configured to translate the inventory carriers along a second lateral direction, opposite the first lateral direction.

3. The storage module of claim 1, wherein the third and fourth conveyor segments are outwardly offset from the first and second conveyor segments with respect to the first and second longitudinal directions such that the first and second conveyor segments are between the third and fourth conveyor segments.

4. The storage module of claim 1, wherein the second conveyor segment is adjoined to the first conveyor segment such that no gap exists between the first and second conveyor segments.

5. The storage module of claim 1, wherein the second conveyor segment is spaced from the first conveyor segment such that a non-zero gap extends between the first and second conveyor segments.

6. The storage module of claim 1, wherein each of the first to fourth conveyor segments includes first and second powered rotating conveyor elements adjacent their respective first and second ends and at least one unpowered rotating conveyor element between the first and second powered rotating conveyor elements.

7. The storage module of claim 1, wherein at least one of the first and second conveyor segments includes the first and second powered rotating conveyor elements and the at least one unpowered rotating conveyor element, and the first and second powered rotating conveyor elements include powered rollers, each configured to rotate about a central axis that extends along the first lateral direction.

8. The storage module of claim 1, wherein at least one of the third and fourth conveyor segments includes the first and second powered rotating conveyor elements and the at least one unpowered rotating conveyor element, and the first and second powered rotating conveyor elements include powered rollers, each configured to rotate about a central axis that extends along the first longitudinal direction.

9. A storage system configured to store inventory items, the storage system comprising:
a first system end, and a second system end that is spaced from the first system end along a first longitudinal direction; and
a plurality of storage modules that extend from the first system end to the second system end, the plurality of storage modules including at least two storage modules stacked on top of one another along a vertical direction, each storage module comprising a plurality of conveyor segments that define a closed conveying loop along a horizontal plane, wherein the conveyor segments of each storage module are configured to translate inventory carriers around a respective one of the closed conveying loops, without transferring inventory carriers into or outside of the respective one of the closed conveying loops, until a desired one of the inventory carriers is presented at one of the first system end and the second system end, wherein for each storage module, at least one of the conveyor segments comprises first and second powered rotating conveyor elements adjacent first and second ends of the at least one of the conveyor segments, respectively, and at least one unpowered rotating conveyor element between the first and second powered rotating conveyor elements, the first and second powered rotating conveyor elements configured to drive the inventory carriers along a conveyor surface of the at least one of the conveyor segments.

10. The storage system of claim 9, wherein the plurality of conveyor segments of each storage module includes:
a first conveyor segment having first and second ends and configured to translate inventory carriers from the first end to the second end along a first longitudinal direction;
a second conveyor segment offset from the first conveyor segment along a first lateral direction, perpendicular to the first longitudinal direction, the second conveyor segment having first and second ends and being configured to translate inventory carriers from the second end of the second conveyor segment to the first end of the second conveyor segment along a second longitudinal direction, opposite the first longitudinal direction;
a third conveyor segment that has first and second ends, that extends from the second end of the first conveyor segment to the second end of the second conveyor segment, and that is configured to translate inventory carriers from the second end of the first conveyor segment to the second end of the second conveyor segment; and
a fourth conveyor segment that has first and second ends, that extends from the first end of the second conveyor segment to the first end of the first conveyor segment and that is configured to translate inventory carriers from the first end of the second conveyor segment to the first end of the first conveyor segment along a second lateral direction, opposite the first lateral direction.

11. The storage system of claim 10, wherein, for each storage module, the third conveyor segment is configured to translate inventory carriers along the first lateral direction that is perpendicular to the first longitudinal direction, and the fourth conveyor segment is configured to translate the inventory carriers along a second lateral direction, opposite the first lateral direction.

12. The storage system of claim 10, wherein, for each storage module, the second conveyor segment is offset from the first conveyor segment by a distance that is no greater than an outer-most width of one of the first and second conveyor segments along the first lateral direction.

13. The storage system of claim 10, wherein, for each storage module, each of the first to fourth conveyor segments includes at least one powered rotating conveyor element that is configured to drive the inventory carriers along a conveyor surface of a respective one of the first to fourth conveyor segments.

14. The storage system of claim 13, wherein, for each storage module, each of the first to fourth conveyor segments comprises first and second powered rotating conveyor elements adjacent the first and second ends of the at least one of the first to fourth conveyor segments, respectively.

15. The storage system of claim 14, wherein, for each storage module, each of the at least one of the first to fourth conveyor segments comprises at least one unpowered rotating conveyor element between its respective first and second powered rotating conveyor elements.

16. A method of operating a storage system configured to store inventory items, the method comprising:
   causing a desired inventory carrier to be identified from a plurality of inventory carriers supported by the system;
   causing a location of the desired inventory carrier within the system to be identified by identifying a select storage module that supports the desired inventory carrier from a plurality of storage modules of the system that are stacked on top of one another, each storage module comprising a plurality of conveyor segments that define a closed conveying loop along a horizontal plane;
   causing inventory carriers supported by the select storage module to be translated around the closed conveying loop of the select storage module, without transferring inventory carriers into or out of the closed conveying loop of the select storage module, until the desired inventory carrier is presented at a desired one first and second ends of the select storage module, wherein the inventory carriers are driven along a conveyor surface of at least one of the conveyor segments of the select storage module by first and second powered rotating conveyor elements that are adjacent to first and second ends of the at least one of the conveyor segments and separated by at least one unpowered rotating conveyor element between the first and second powered rotating conveyor elements; and
   causing an inventory item to be retrieved from, or stowed into, the desired inventory carrier.

17. The method of claim 16, wherein the step of causing the inventory item to be retrieved from, or stowed into, the desired inventory carrier comprises causing a robotic manipulator to move so as to retrieve or stow the inventory item.

18. The method of claim 16, wherein the step of causing the inventory carriers to be translated comprises causing the inventory carriers to be translated along a first conveyor segment in a first longitudinal direction, along a second conveyor segment in a second longitudinal direction, opposite first longitudinal direction, along a third conveyor segment from the first conveyor segment to the second conveyor segment, and along a fourth conveyor segment from the second conveyor segment to the first conveyor segment.

* * * * *